(No Model.)
F. W. KELLY.
VALVE FOR WATER COCKS.
No. 279,569. Patented June 19, 1883.
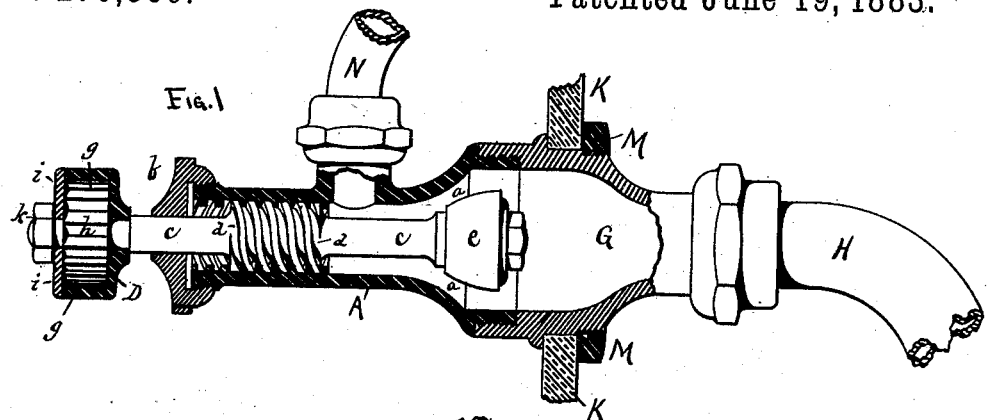
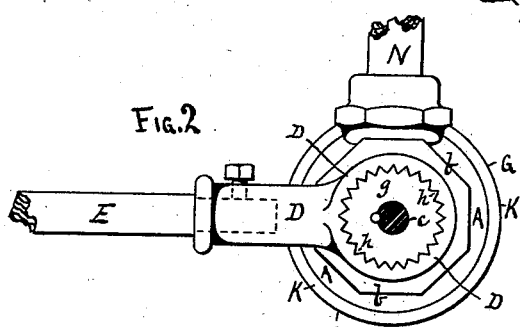
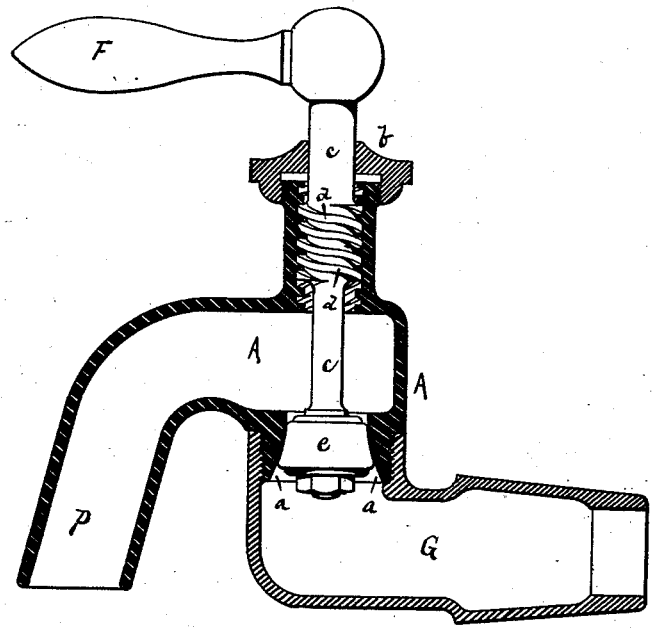
WITNESSES.
Louis Feeser Jr.
Daniel Murphy
Frances William Kelly
INVENTOR, By
Louis Feeser & Co,
atty's.

UNITED STATES PATENT OFFICE.

FRANCIS W. KELLY, OF MINNEAPOLIS, MINNESOTA.

VALVE FOR WATER-COCKS.

SPECIFICATION forming part of Letters Patent No. 279,569, dated June 19, 1883.

Application filed November 21, 1882. (No model.)

*To all whom it may concern:*

Be it known that I, FRANCIS WILLAM KELLY, a citizen of the United States, and a resident of Minneapolis, in the county of Hennepin and State of Minnesota, have invented certain new and useful Improvements in Valves for Water-Cocks, of which the following is a full, clear, and exact description, reference being also had to the accompanying drawings, in which—

Figure 1 is a sectional side view, and Fig. 2 is a front view, of the cock as used in the tanks of water-closets and similar places. Fig. 3 shows the construction when applied to an ordinary "bib-cock."

This invention relates to valves for water-cocks; and it consists in the construction and the combination of parts hereinafter particularly described, and then sought to be specifically defined by the claims.

A is the main casing, having a valve-seat, *a*, formed in one end, and with a stuffing-box, *b*, at the other end, through which the valve-stem *c* passes. This valve-stem is formed with a screw-thread, *d*, upon a portion of its periphery, near its center, adapted to fit into a corresponding thread in the casing A, and is provided on one end with a rubber or other flexible valve, *e*, adapted to fit upon the seat *a*. When used in the tanks of water-closets and for similar purposes, as shown in Figs. 1 and 2, the outer end of the valve-stem *c* will be provided with a small plate or disk, *g*, having its rim formed into serrations *h*, adapted to fit into corresponding serrations in a collar, D, into which the arm E of the float of the tank is secured.

A washer, *i*, and nut *k* serve to hold the collar and serrated disk in place upon the stem *c*. By this means the collar D is held firmly upon the disk and valve-stem, and the disk and stem will both be revolved by the raising and lowering of the arm E, while at the same time, by removing the nut *k* and washer *i*, the serrated collar D may be removed from the disk *g* and turned to the right or left to any desired extent, and replaced upon the disk with another set of the serrations *h* in contact with the serrations in the collar, thereby altering the position of the float-arm E, so that a higher or lower stage of water will be necessary to open or close the valve *e*. When used as shown in Fig. 3 a simple handle, F, will be attached to the outer end of the stem *c* instead of the serrated disk *g* and collar D to turn the valve-stem.

The valve-seat *a* will be curved outward, as shown, and the flexible valve curved in the opposite direction, so that when the valve and its seat come in contact two oppositely-curving surfaces meet, and then when the screw on the valve-stem is turned up the flexible valve *e* will be drawn up into the seat *a*, and assume the form shown in Fig. 3. The form of valve *e* and its seat and the arrangement of the two parts as shown exert such a lateral and downward pressure when the valve is closed that when the valve-rod is unscrewed the valve will be assisted by the elastic pressure in leaving its seat.

Attached to the opposite end of the casing A from the stuffing-box *b* is another casing, G, to which the water-supply pipe H is attached in the ordinary manner, as shown in Fig. 1, or the end of the casing G formed tapering to adapt it to be attached to a lead pipe, or arranged in any other suitable manner that may be desired to adapt the cock to its various uses.

In Fig. 1 the casing G is shown attached to the wall K of the tank of a water-closet by a jam-nut, M.

In Figs. 1 and 2 the outlet from the casing A is in the form of a small pipe, N, leading to the bowl of the water-closet, and adapted to "flush" it when the water in the tank falls low enough to allow the float to open the valve *e*, while in Fig. 3 the exit from the casing A is in the form of the ordinary spout or nozzle, P.

The screw-thread *d* is what is commonly known as a "double thread," or two threads cut one inside the other, so that just twice as much throw may be given to the valve by the same movement of the stem *c* as with a single-thread screw; hence the valve may be opened and closed one-half quicker than would be the case with a single-thread screw. This is especially advantageous when used as shown in Fig. 1, as the float which operates the valve *e* need rise and fall only one-half as far as with a single-thread screw to open the valve the same distance.

By combining with the valve operating as described the double screw-thread on the stem, the action of the two parts—stem and valve—is more positive than when otherwise constructed, and the valve can be set and left at any adjustment without danger of displacement by the force of the flow of the water.

Having described my invention and set forth its merits, what I claim is—

1. The casing A, provided with the outwardly-curved valve-seat $a$, in combination with the valve-stem $c$, provided with the double-threaded screw $d$, and at one end with the flexible valve $e$, curved in the opposite direction to the valve-seat, the valve fitting onto its seat from the water-supply side, whereby the several parts will operate as set forth.

2. The combination of casing A, provided with the outwardly-curved valve-seat, the valve-stem $c$, provided with double-threaded screw $d$, and flexible valve $e$, curved in the opposite direction to the valve-seat, and fitted into the casing, as shown, and the casing G, detachably secured to casing A, substantially as and for the purposes set forth.

3. The combination of a valve, its casing and seat, a serrated plate on the valve-stem, and a collar fitting around the plate with serrations corresponding to those on the plate, and provided with means for connecting it with the arm of a float, whereby the float-arm can be adjusted, substantially as and for the purpose set forth.

4. The combination of casing A, provided with the exit-pipe N, outwardly-curved valve-seat $a$, and screw-threaded stuffing-box $b$, the valve-stem $c$, provided with double-threaded screw $d$, valve $e$, curved oppositely to the valve-seat and fitting therein, as shown, and a serrated disk at its outer end, and the collar D, having serrations corresponding to those on the disk and secured thereto, substantially as and for the purposes set forth.

In testimony whereof I have hereunto set my hand in the presence of two subscribing witnesses.

FRANCIS WILLAM KELLY.

Witnesses:
C. N. WOODWARD,
LOUIS FEESER, Sr.